US007911458B2

(12) United States Patent
Teranishi

(10) Patent No.: US 7,911,458 B2
(45) Date of Patent: Mar. 22, 2011

(54) DISPLAY CONTROL CIRCUIT

(75) Inventor: Kentaro Teranishi, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 720 days.

(21) Appl. No.: 11/563,510

(22) Filed: Nov. 27, 2006

(65) Prior Publication Data

US 2007/0120800 A1 May 31, 2007

(30) Foreign Application Priority Data

Nov. 30, 2005 (JP) ................................ 2005-346815

(51) Int. Cl.

| | |
|---|---|
| ***G06F 3/038*** | (2006.01) |
| ***G09G 5/00*** | (2006.01) |
| ***G09G 3/36*** | (2006.01) |
| ***G02F 1/1345*** | (2006.01) |
| ***G02F 1/13*** | (2006.01) |
| ***H04N 17/00*** | (2006.01) |
| ***H04N 17/02*** | (2006.01) |

(52) U.S. Cl. .......... 345/204; 345/98; 349/149; 349/187; 324/770; 348/180

(58) Field of Classification Search .................. 345/204, 345/212, 213, 98, 99; 348/177, 180, 181, 348/194, 719, 721, 725, 790, 189; 324/770; 710/5, 29, 33–35, 110; 709/208; 349/149–152, 187–192; 702/117; 445/2, 63
See application file for complete search history.

(56) References Cited

U.S. PATENT DOCUMENTS

| | | | | |
|---|---|---|---|---|
| 4,755,807 | A * | 7/1988 | Guennou | 345/83 |
| 6,085,307 | A * | 7/2000 | Evoy et al. | 712/31 |
| 6,617,796 | B2 * | 9/2003 | Sasaki et al. | 315/169.1 |
| 6,912,680 | B1 * | 6/2005 | Keeth | 714/736 |
| 2006/0087247 | A1 * | 4/2006 | Malmberg | 315/169.2 |
| 2007/0112986 | A1 * | 5/2007 | Chang | 710/116 |

FOREIGN PATENT DOCUMENTS

| | | | |
|---|---|---|---|
| JP | 58109945 | A * | 6/1983 |
| JP | 2003-190559 | | 7/2003 |

* cited by examiner

*Primary Examiner* — Bipin Shalwala
*Assistant Examiner* — Ilana Spar
(74) *Attorney, Agent, or Firm* — Oblon, Spivak, McClelland, Maier & Neustadt, L.L.P.

(57) ABSTRACT

A display control circuit includes a driver circuit DR which drives a plurality of pixels, and a driver control circuit which controls the driver circuit. The driver control circuit includes a control bus which transfers instruction data, an operation setting unit which executes operation settings in accordance with the instruction data from the control bus, and a gateway unit provided for a case in which the instruction data is internally generated and output to the control bus, and is capable of enabling or disabling an instruction data output to the control bus in accordance with a control input signal.

2 Claims, 3 Drawing Sheets

DISPLAY CONTROL CIRCUIT

CROSS-REFERENCE TO RELATED APPLICATIONS

This application is based upon and claims the benefit of priority from prior Japanese Patent Application No. 2005-346815, field Nov. 30, 2005, the entire contents of which are incorporated herein by reference.

BACKGROUND OF THE INVENTION

1. Field of the Invention

The present invention relates to a display control circuit which is applied to a flat display panel such as a liquid crystal display panel.

2. Description of the Related Art

Flat-panel display devices, which are represented by liquid crystal display devices, are widely used in order to display images on personal computers, TV receivers, car navigation systems, etc.

A typical liquid crystal display device includes a liquid crystal display panel in which a plurality of liquid crystal pixels are arrayed in a matrix, and a display control circuit which controls the liquid crystal display panel (see, for instance, Jpn. Pat. Appln. KOKAI Publication No. 2002-196723). A typical liquid crystal display panel has a structure wherein a liquid crystal layer is held between an array substrate and a counter-substrate. The array substrate includes a plurality of pixel electrodes arrayed in a matrix, a plurality of gate lines (or scan lines) which are arranged along the rows of pixel electrodes, a plurality of source lines (or signal lines) arranged along the columns of pixel electrodes, and a plurality of switching elements disposed near intersections between the gate lines and source lines and connect, when the associated gate lines are driven, the associated source lines to the associated pixel electrodes. The counter-substrate includes a common electrode opposed to the pixel electrodes disposed on the array substrate. Each pixel electrode and the common electrode, together with a pixel region that is a part of the liquid crystal layer held between these electrodes, constitute a liquid crystal pixel and control the alignment of liquid crystal molecules in the pixel region by an electric field which corresponds to a liquid crystal driving voltage obtained as a potential difference between the pixel electrode and the common electrode.

The display control circuit includes a driver circuit which drives the liquid crystal pixels, and a driver control circuit which controls the driver circuit. The driver control circuit holds pixel data items which are cyclically extracted as a digital image signal from a video signal supplied from outside, and sets, e.g. the sequential order, resolution, gamma correction amount and display timing of the pixel data items to be suited for the liquid crystal display panel, thereby controlling the driver circuit. The driver circuit includes a gate driver which drives the gate lines so as to sequentially select the rows of pixels, and a source driver which digital-to-analog (D/A) converts the pixel data items for the pixels of a selected row, to pixel voltages and drives the source lines in accordance with the pixel voltages.

In the meantime, in some cases, the driver control circuit is provided with an operation setting unit which sets, e.g., a vertical scanning direction and a gamma correction amount. The operation setting unit is connected via a control bus to a processor, such as a microcomputer, disposed outside the liquid crystal display device. At present, an $I^2C$ bus, proposed by Philips, is prevailing as this control bus. For example, when a product inspection of the liquid crystal display device is conducted, the processor supplies various instruction data to the operation setting unit by a packet communication method, and the operation setting unit executes operation settings in accordance with the instruction data. In this case, the processor functions as a master of the operation setting unit, and the operation setting unit functions as a slave of the processor. In recent years, with versatility in operation settings, there has been an increasing need to provide the driver control circuit with an internal processor, which functions as a second master of the operation setting unit, in addition to the processor that is provided on the outside of the liquid crystal display device. Although the specifications of the $I^2C$ bus support a double master scheme in which two masters are provided for one slave, each of the masters needs to be configured to control the slave during a period in which the control bus is not occupied by the other master, in order to avoid collision of signals on the control bus. The control with this configuration, however, is based on the frequencies and phases of clock signals input to the respective masters, and is complex and difficult.

BRIEF SUMMARY OF THE INVENTION

The object of the present invention is to provide a display control circuit which can avoid collision of signals without requiring complex and difficult control.

According to the present invention, there is provided a display control circuit comprising a driver circuit which drives a plurality of pixels, and a driver control circuit which controls the driver circuit, the driver control circuit including a control bus which transfers instruction data, an operation setting unit which executes operation settings in accordance with the instruction data from the control bus, and a gateway unit provided for a case in which the instruction data is internally generated and output to the control bus, and is capable of enabling or disabling an instruction data output to the control bus in accordance with a control input signal.

In this display control circuit, the gateway unit is capable of enabling or disabling the instruction data output to the control bus in accordance with the control input signal. Thus, for example, in the case where the internal processor is provided in the display control circuit, the external processor is provided outside the display control circuit and the internal processor and the external processor are commonly connected over the control bus, the instruction data output from the internal processor to the control bus can temporarily be disabled by the control input signal. Thereby, the instruction data can be supplied from the external processor to the operation setting unit during this period without causing a collision of signals on the control bus. In short, a collision of signals on the control bus can be avoided without requiring complex and difficult control. In addition, the present structure is applicable to the case where no internal processor is required, if the control input signal is used to always disable the instruction data output from the internal processor to the control bus. Furthermore, in the case where the external processor is connected to the control bus for the purpose of a product inspection, the instruction data output from the internal processor to the control bus may be disabled only during the product inspection. After the product inspection, the instruction data output from the internal processor to the control bus may be enabled. Thereby, a collision of signals on the control bus, which may occur during the product inspection, can be avoided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
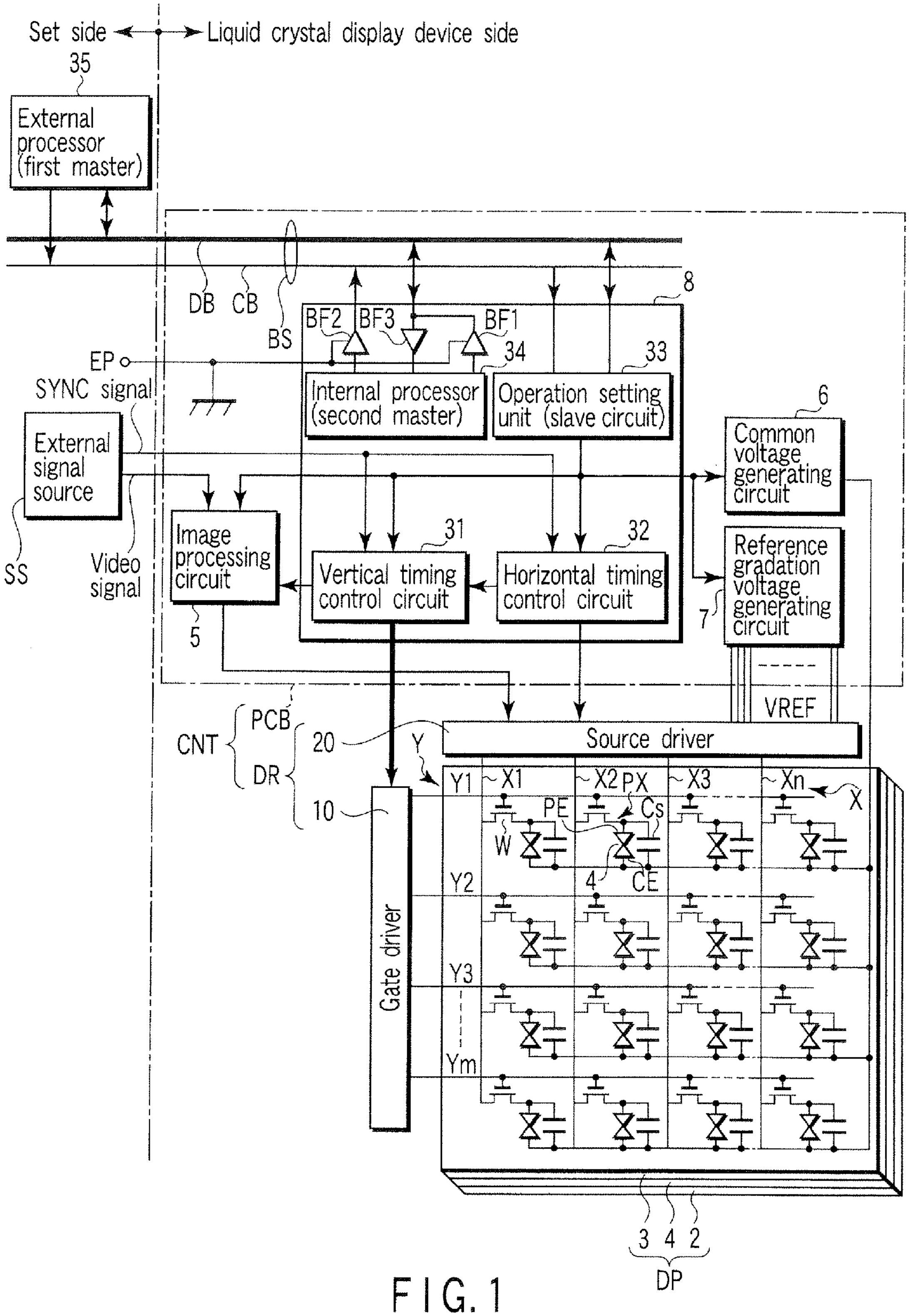
FIG. 1 schematically shows the circuit structure of a liquid crystal display device according to an embodiment of the present invention.

A liquid crystal display device according to an embodiment of the present invention will now be described with reference to the accompanying drawings. FIG. 1 schematically shows the circuit structure of the liquid crystal display device. The liquid crystal display device includes a liquid crystal display panel DP and a display control circuit CNT that controls the liquid crystal display panel DP. The liquid crystal display panel DP is configured such that a liquid crystal layer 4 is held between an array substrate 2 and a counter-substrate 3. The array substrate 2 includes a plurality of pixel electrodes PE arrayed in a matrix on a transparent insulating substrate such as a glass substrate; a plurality of gate lines Y (Y1 to Ym) arranged along the rows of pixel electrodes PE; a plurality of source lines X (X1 to Xn) arranged along the columns of pixel electrodes PE; and a plurality of switching elements W which are arranged near intersections between the gate lines Y and source lines X, and driven by the associated gate lines Y to connect the associated source lines X to the associated pixel electrodes PE, respectively. The counter-substrate 3 includes a color filter (not shown) disposed on a transparent insulating substrate such as a glass substrate, and a common electrode CE which is disposed on the color filter and opposed to pixel electrodes PE. The color filter is formed of red, green and blue color layers formed in stripes and arranged such that the color layers are repeated in the row direction. Each of the pixel electrodes PE and the common electrode CE are formed of transparent electrode material such as ITO. Each pixel electrode PE and the common electrode CE, together with a pixel region that is a part of the liquid crystal layer 4 held between these electrodes, constitute a liquid crystal pixel PX. The alignment of liquid crystal molecules in the pixel region is controlled by an electric field which corresponds to a liquid crystal driving voltage that is obtained as a potential difference between the pixel electrode PE and the common electrode CE. All the pixels PX have storage capacitances Cs. The storage capacitances Cs are obtained by electrically connecting a plurality of storage capacitance lines, which are capacitive-coupled to the rows of pixel electrodes PE on the array substrate 2 side, to the common electrode CE.

The display control circuit CNT includes a driver circuit DR which drives the liquid crystal pixels PX, and a driver control circuit PCB which controls the driver circuit DR. These components are disposed on a printed circuit board independent from the liquid crystal display panel DP. The driver control circuit PCB includes an image processing circuit 5. The image processing circuit 5 internally holds pixel data items which are cyclically extracted as a digital image signal from a video signal supplied from outside, and performs an image process for converting the pixel data items to be suited for the liquid crystal display panel DP. The driver control circuit 5 further includes a common voltage generating circuit 6 which generates a common voltage Vcom to the common electrode CE on the counter-substrate 3; a reference gradation voltage generating circuit 7 which generates a predetermined number of reference gradation voltages VREF used to convert, e.g., 6-bit pixel data items for the respective pixels PX to pixel voltages; and a controller 8 which executes various controls for the image processing circuit 5, common voltage generating circuit 6, reference gradation voltage generating circuit 7, a gate driver 10 and a source driver 20. The driver circuit DR includes the gate driver 10 which drives the gate lines Y so as to sequentially select the rows of pixels PX, and the source driver 20 which digital-to-analog (D/A) converts pixel data items for the pixels PX of a selected row to pixel voltages and drives the source lines X in parallel in accordance with the pixel voltages. The gate driver 10 and source driver 20 are disposed on a tape carrier package (TCP) fixed to, for example, an end portion of the liquid crystal display panel DP.

The gate driver 10 is controlled by a vertical scanning control signal CTY so as to sequentially select the gate lines Y in every 1 vertical scanning period (1V) and to output a scanning signal, which turns on the pixel switching elements W, to the selected gate line Y. The source driver 20 is controlled by a horizontal scanning control signal CTX so as to digital-to-analog (D/A) convert pixel data items for the pixels PX of the row selected corresponding to a selected gate line Y, to pixel voltages and to output the pixel voltages to the source lines X. The pixel voltages on the source lines X are applied to the pixel electrodes PE of the pixels PX of the selected row via the pixel switching elements W of one row which are turned on by the scanning signal from the selected gate line Y.

The controller 8 includes a vertical timing control circuit 31 which detects a vertical scanning period (1V) from a sync signal and synchronizes the operations of the image processing circuit 5 and gate driver 10 with the vertical scanning period; a horizontal timing control circuit 32 which detects a horizontal scanning period (1H) from the sync signal and synchronizes the operations of the vertical timing control circuit 31 and source driver 20 with the horizontal scanning period; an operation setting unit 33 which executes various operation settings for the components of the driver control circuit PCB; and an internal processor 34 which controls the operation setting unit 33.

The gate driver 10 is composed by using, e.g., a bidirectional shift register. In this case, the vertical timing control circuit 31 outputs to the gate driver 10 a vertical scanning control signal CTY which includes a vertical start signal, a vertical clock signal and a shift-direction designation signal. In the gate driver 10, the bidirectional shift register shifts the vertical start signal in response to the vertical clock signal, and sequentially selects the gate lines Y1 to Ym at a timing corresponding to the shift position of the vertical start signal. The shift direction of the bidirectional shift register is designated by the shift-direction designation signal.

The source driver 20 is composed by using, for example, a shift register, a latch circuit and a D/A conversion circuit. In this case, the horizontal timing control circuit 32 outputs to the source driver 20 a horizontal scanning control signal CTX which includes a horizontal start signal, a horizontal clock signal, a latch output signal and a polarity signal. In the source driver 20, the shift register shifts the horizontal start signal in response to the horizontal clock signal, and causes the latch circuit to sequentially latch the pixel data items, which are serially supplied from the image processing circuit 5 with respect to the pixels PX of the row corresponding to the selected gate line Y, at a timing corresponding to the shift position of the horizontal start signal. In response to the latch output signal, the latch circuit outputs the pixel data to the D/A conversion circuit in a parallel fashion. The D/A conversion circuit converts the pixel data to pixel voltages, and outputs the pixel voltages to the source lines X1 to Xn with a polarity corresponding to the polarity signal.

The operation setting unit 33 is a slave circuit controlled by an external processor 35 and an internal processor 34, which function as a first master and a second master, respectively. The operation setting unit 33 executes operation settings for the components of the driver control circuit PCB, such as the image processing circuit 5, common voltage generating circuit 6, reference gradation voltage generating circuit 7, vertical timing control circuit 31 and horizontal timing control circuit 32. The external processor 35 and internal processor 34 are connected to the operation setting unit 33 over a control bus BS for packet communication, which is disposed on a printed circuit board. The image processing circuit 5, common voltage generating circuit 6, reference gradation voltage generating circuit 7, vertical timing control circuit 31 and horizontal timing control circuit 32 are connected to the operation setting unit 33 over a wiring line independent from the control bus BS. In a concrete example of the operation settings, as regards the image processing circuit 5, the sequential order and resolution of the pixel data items, for instance, are set to be suited for the liquid crystal display panel DP. As regards the common voltage generating circuit 6 and reference gradation voltage generating circuit 7, the voltage value of the common voltage Vcom and the voltage values of a predetermined number of reference gradation voltages VREF are set. The voltage values of the predetermined number of reference gradation voltages VREF are variable for gamma correction. As regards the vertical timing control circuit 31, the vertical scanning direction (shift direction of the shift register) in which the gate lines Y1 to Ym are sequentially selected is set. As regards the horizontal timing control circuit 32, the number of rows of pixels PX, which is a unit of polarity reversal, is set.

The internal processor 34 is a 1-chip microcomputer which stores software in, e.g., an EPROM, and generates various instruction data for controlling the operation setting unit 33. The internal processor 34 is connected to the control bus BS via a gateway unit GW. The gateway unit GW is provided for the case in which the instruction data are output from the internal processor 34 to the control bus BS. On the basis of a control input signal from a control input terminal EP provided on the printed circuit board, the gateway unit GW is capable of enabling or disabling the instruction data output to the control bus BS.

The external processor 35 is a computer provided on the outside of the liquid crystal display device, for example, in order to perform a product inspection. In the product inspection, the external processor 35 generates various instruction data for controlling the operation setting unit 33. This computer is directly connected to the control bus BS in order to control the operation setting unit 33 at the time of the product inspection. In this case, the control input signal is input to the control input terminal EP from the external processor 35 or some other circuit.

In the meantime, the control bus BS includes a data bus DB for transferring a packet signal of instruction data, and a clock bus CB for transferring a clock signal for extracting the instruction data from the packet signal. The gateway unit GW includes a packet signal output buffer BF1 for outputting the packet signal from the internal processor 34 to the data bus DB, a clock signal output buffer BF2 for outputting the clock signal from the internal processor 34 to the clock bus CB, and a packet signal input buffer BF3 for inputting the packet signal from the data bus to the internal processor 34. The packet signal output buffer BF1 and clock signal output buffer BF2 are kept in a high-impedance output state when the packet signal and clock signal are not output.

In the product inspection of the liquid crystal display device having the above-described structure, in the case where the external processor 35 is connected to the control bus BS, the control input signal from the control input terminal EP is set at a low level. In accordance with this control input signal, the gateway unit GW disables the instruction data output from the internal processor 34 to the control bus BS. Thereby, the control bus BS is set in the state in which the control bus BS is not occupied by the internal processor 34. For example, when the packet signal of instruction data, which sets the vertical scan direction and gamma correction amount, is output from the external processor 35 to the control bus BS, this packet signal does not collide with another packet signal from the internal processor 34 on the control bus BS and can be delivered to the operation setting unit 33.

After the production inspection of the liquid crystal display device, if the external processor 35 is disconnected from the control bus BS, the control input signal from the control input terminal EP is set at a high level. In accordance with this control input signal, the gateway unit GW enables the instruction data output from the internal processor 34 to the control bus BS. Thereby, the control bus BS is set in the state in which the control bus BS is occupied by the internal processor 34. For example, when the packet signal of instruction data, which sets the vertical scan direction and gamma correction amount, is output from the internal processor 34 to the control bus BS, this packet signal does not collide with another packet signal from the external processor 35 on the control bus BS and can be delivered to the operation setting unit 33.

In the present embodiment, the gateway unit GW is capable of enabling or disabling the instruction data output to the control bus BS, in accordance with the control input signal. Thus, a collision of signals on the control bus BS, which would occur during the product inspection, can be avoided by such a simple control that the instruction data output from the internal processor 34 to the control bus BS is disabled by the control input signal only during the product inspection, and the instruction data output from the internal processor 34 to the control bus BS is enabled after the product inspection.

The present invention is not limited to the above-described embodiment, and various modifications can be made without departing from the spirit of the invention.

Figure 2:
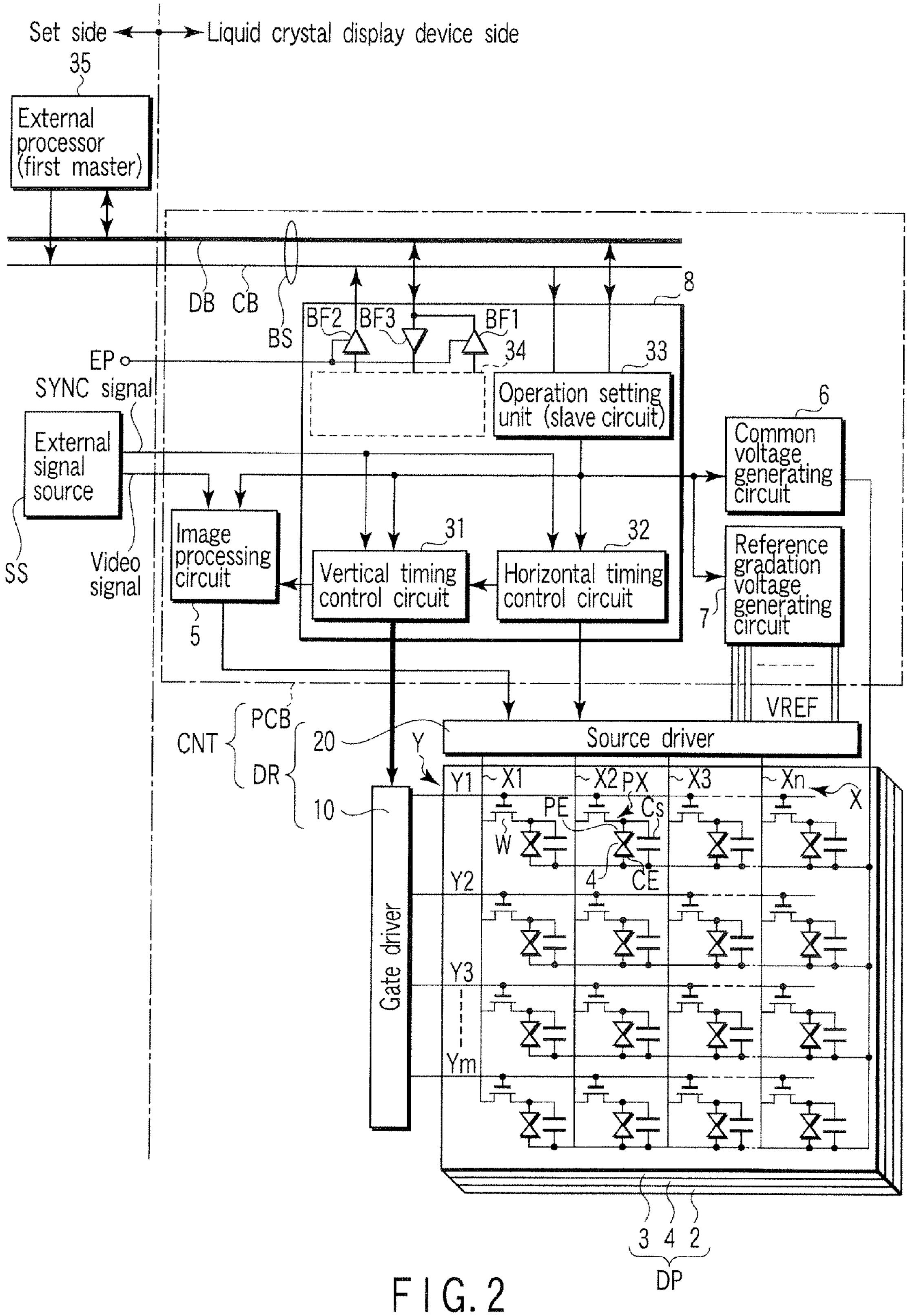
FIG. 2 shows a first modification of a driver control circuit shown in FIG. 1.

In the above-described embodiment, the internal processor 34 shown in FIG. 1 is disposed as a part of the controller 8 on the printed circuit board. In a product in which there is no need to control the operation setting unit 33 by the internal processor 34, the control input terminal EP may be grounded by, e.g., a jumper pin, as shown in FIG. 2, and the control input signal may always be set at a low level. In this manner, the structure of the above-described embodiment may be modified such that the internal processor 34 is not mounted on the printed circuit board. In this modification, the instruction data output from the internal processor 34 to the control bus BS can always be disabled. Thus, as regards the specifications of the product, the flexibility that permits selection of provision/non-provision of the internal processor 34 can be obtained. This reduces the manufacturing cost, compared to the case in which the printed circuit board for the driver control circuit PCB is designed in accordance with specifications of individual products.

Figure 3:
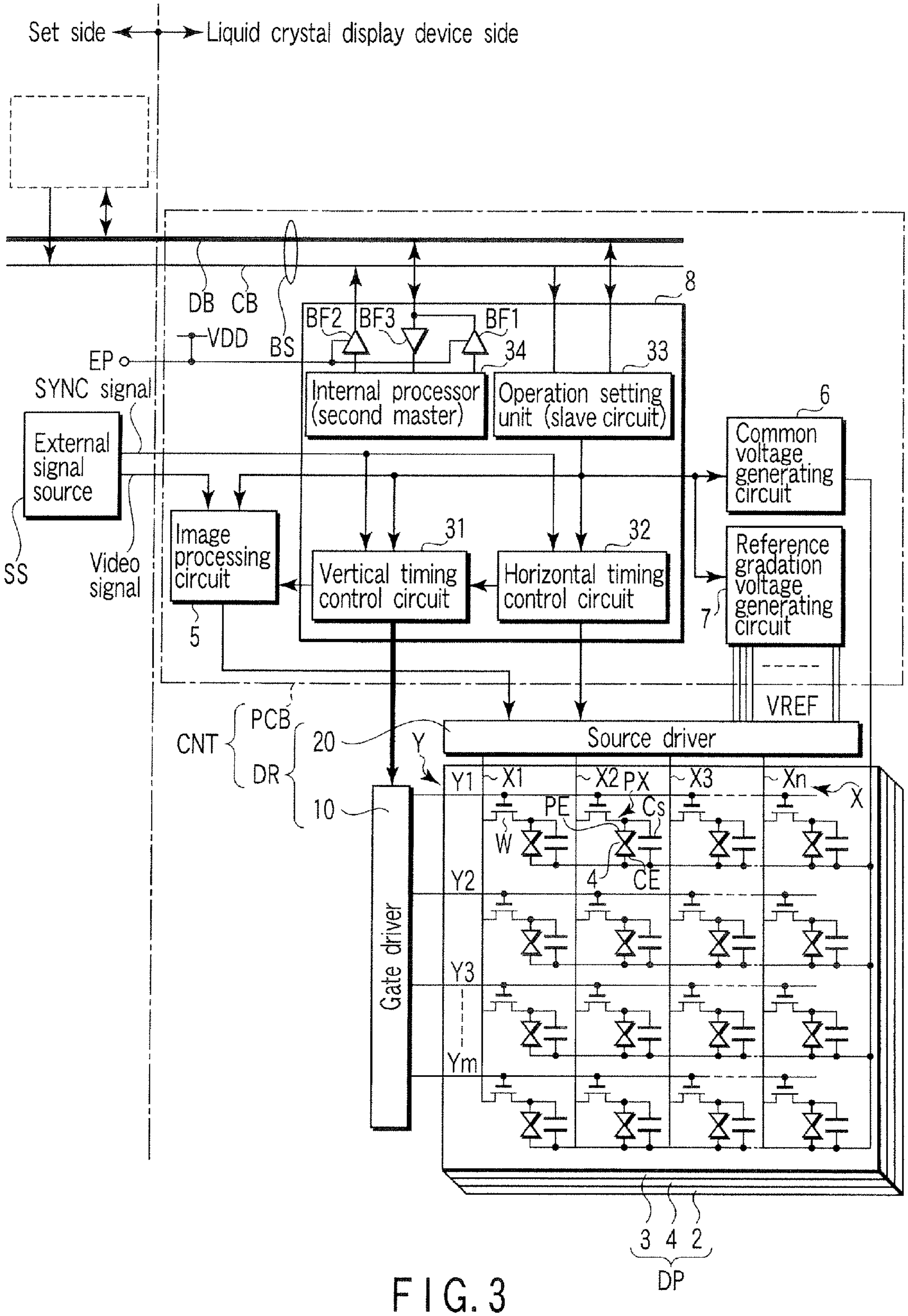
FIG. 3 shows a second modification of the driver control circuit shown in FIG. 1.

In the above-described embodiment, the external processor 35 shown in FIG. 1 is provided outside the liquid crystal display device in order to conduct the product inspection. In the case of a product which requires no control of the operation setting unit 33 by the external processor 35 in the product inspection, a modification of the structure, as shown in FIG. 3, may be adopted, wherein the control input terminal EP is connected to a power supply terminal VDD by, e.g., a jumper pin, thereby setting the control input signal at a high level at all times and disconnecting the internal processor 34 from the control bus BS. In this modification, the instruction data output from the internal processor 34 to the control bus BS can always be enabled. Thus, like the above-described modification, as regards the specifications of the product, the flexibility that permits selection of provision/non-provision of the external processor 35 can be obtained. This reduces the manufacturing cost, compared to the case in which the printed circuit board for the driver control circuit PCB is designed in accordance with specifications of individual products.

In the above-described embodiment, the gateway unit GW is controlled by the control input signal from the control input terminal EP. Alternatively, the circuit connection may be changed such that the control input signal is input from the internal processor 34 or operation setting unit 33 to the control input terminal EP. For example, only during a predetermined period after power-on, the control input signal may be set at a low level so as to disable the instruction data output from the internal processor 34 to the control bus BS. Only during this period, may the control bus BS be occupied by the external processor 35. If the external processor 35 actually outputs the instruction data to the control bus BS in the predetermined period, it becomes possible to execute such an arbitrary control for the internal processor 34 or operation setting unit 33 that the period of occupation of the control bus BS by itself is extended.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display control circuit comprising:

a driver circuit which drives a plurality of pixels; and a driver control circuit which controls said driver circuit, wherein said driver control circuit includes a control bus which transfers instruction data, an operation setting unit which executes operation settings in accordance with the instruction data from said control bus, an internal processor which supplies the instruction data for said operation setting unit via the control bus, and a gateway unit which is provided between said control bus and said internal processor, and includes a control input terminal receiving a control input signal from a detachable external processor capable of controlling the operation setting unit, the gateway unit disabling an instruction data output from the internal processor to the control bus in accordance with the control bus signal from the external processor when the external processor is connected to the control bus, wherein said control bus includes a data bus for transferring a packet signal of the instruction data, and a clock bus for transferring a clock signal for extracting the instruction data from the packet signal, and wherein said gateway unit further includes a packet signal output buffer which outputs the packet signal to said data bus, and a clock signal output buffer which outputs the clock signal to said clock bus, and said packet signal output buffer and said clock signal output buffer are kept in a high-impedance output state in accordance with the control input signal received from said external processor via said control input terminal when the external processor is connected to the control bus.

2. The display control circuit according to claim 1, wherein said driver control circuit includes an image processing circuit, a vertical timing control circuit, a horizontal timing control circuit, a common voltage generating circuit, and a reference gradation voltage generating circuit, and said operation setting unit is configured to execute an operation setting of at least one of said image processing circuit, said vertical timing control circuit, said horizontal timing control circuit, said common voltage generating circuit, and said reference gradation voltage generating circuit.

* * * * *